(12) United States Patent
Hawke et al.

(10) Patent No.: US 11,371,437 B2
(45) Date of Patent: Jun. 28, 2022

(54) INSERTION TOOL

(71) Applicant: Oliver Crispin Robotics Limited, Altrincham (GB)

(72) Inventors: Trevor Owen Hawke, Bristol (GB); Andrew Crispin Graham, Badminton (GB); Jason Ralph Gordon Curle, Bristol (GB); Grant David Paul Westgarth, Bristol (GB)

(73) Assignee: Oliver Crispin Robotics Limited, Altrincham (GB)

( * ) Notice: Subject to any disclaimer, the term of this patent is extended or adjusted under 35 U.S.C. 154(b) by 129 days.

(21) Appl. No.: 16/813,829

(22) Filed: Mar. 10, 2020

(65) Prior Publication Data

US 2021/0285374 A1 Sep. 16, 2021

(51) Int. Cl.
*F02C 7/06* (2006.01)
*G01M 15/14* (2006.01)

(52) U.S. Cl.
CPC .............. *F02C 7/06* (2013.01); *G01M 15/14* (2013.01)

(58) Field of Classification Search
CPC .................................. G01M 15/14; F02C 7/06
See application file for complete search history.

(56) References Cited

U.S. PATENT DOCUMENTS

| | | | |
|---|---|---|---|
| 5,102,221 A | 4/1992 | Desgranges et al. | |
| 5,203,646 A | 4/1993 | Landsberger et al. | |
| 5,323,962 A | 6/1994 | Jassby et al. | |
| 5,385,102 A | 1/1995 | Villedieu et al. | |
| 5,501,156 A | 3/1996 | Richter | |
| 5,644,394 A | 7/1997 | Owens | |
| 6,156,974 A | 12/2000 | Blasé | |
| 6,371,148 B1 | 4/2002 | Tripp | |
| 6,481,195 B1 | 11/2002 | Blase | |
| 6,698,456 B2 | 3/2004 | Neubauer et al. | |
| 7,171,279 B2 | 1/2007 | Buckingham et al. | |
| 7,182,024 B2 | 2/2007 | Pfeiffer | |
| 7,185,407 B2 | 3/2007 | Boyl-Davis et al. | |
| 7,258,521 B2 | 8/2007 | Guerra et al. | |
| 7,509,735 B2 | 3/2009 | Philip et al. | |
| 7,677,181 B2 | 3/2010 | Boyl-Davis et al. | |
| 7,718,894 B2 | 5/2010 | Blasé | |
| 8,096,030 B2 | 1/2012 | Graichen | |
| 9,016,159 B2 | 4/2015 | Kell et al. | |
| 9,263,866 B2 | 2/2016 | Shimizu | |
| 9,329,377 B2 | 5/2016 | Kell et al. | |

(Continued)

FOREIGN PATENT DOCUMENTS

EP 3572632 A1 11/2019
WO 2011/092891 A1 8/2011

*Primary Examiner* — Natalie Huls
*Assistant Examiner* — Cynthia L Davis
(74) *Attorney, Agent, or Firm* — Fitch, Even, Tabin & Flannery LLP

(57) ABSTRACT

A tool for inserting into a cavity is provided. The tool includes a plurality of segments moveably coupled to one another, each segment moveable relative to an adjacent segment between a bent position and a coupled position, the plurality of segments including a first segment, the first segment including: a core formed of a first material; and a shell formed of a second material and comprising or defining a guide feature, a drive feature, a line guide, or a combination thereof; wherein the first material defines a greater stiffness than the second material.

20 Claims, 9 Drawing Sheets

(56) References Cited

U.S. PATENT DOCUMENTS

| | | |
|---|---|---|
| 9,399,299 B2 | 7/2016 | Hermey et al. |
| 9,403,244 B2 | 8/2016 | Rautenberg et al. |
| 9,409,292 B2 | 8/2016 | Smith et al. |
| 9,435,750 B2 | 9/2016 | Matsumoto |
| 10,428,993 B2 | 10/2019 | Whitefield et al. |
| 2005/0075538 A1* | 4/2005 | Banik .................. A61B 1/0016 |
| | | 600/141 |
| 2006/0074383 A1 | 4/2006 | Boulais |
| 2008/0199304 A1 | 8/2008 | Moran et al. |
| 2010/0160736 A1 | 6/2010 | Padget |
| 2015/0338353 A1* | 11/2015 | Bancalari ............. H04N 5/2252 |
| | | 348/82 |
| 2015/0360629 A1 | 12/2015 | Sekino et al. |
| 2016/0040803 A1 | 2/2016 | Steeger |
| 2017/0023154 A1 | 1/2017 | Jaeker et al. |
| 2017/0239762 A1 | 8/2017 | Roberts et al. |
| 2017/0319048 A1 | 11/2017 | Ikeda |
| 2017/0361470 A1 | 12/2017 | Otero Del Real et al. |
| 2018/0156062 A1 | 6/2018 | Dede et al. |
| 2018/0156132 A1 | 6/2018 | Dede et al. |
| 2018/0361960 A1 | 12/2018 | Yamamoto et al. |
| 2019/0190190 A1 | 6/2019 | Bourgeas et al. |
| 2019/0360794 A1 | 11/2019 | Graham et al. |

\* cited by examiner

INSERTION TOOL

FIELD

The present subject matter relates generally to a tool for inspecting an environment and/or performing maintenance operations on a component within the environment, such as within an annular space in a turbine engine.

BACKGROUND

At least certain gas turbine engines include, in serial flow arrangement, a compressor section including a low pressure compressor and a high-pressure compressor for compressing air flowing through the engine, a combustor for mixing fuel with the compressed air such that the mixture may be ignited, and a turbine section including a high pressure turbine and a low pressure turbine for providing power to the compressor section.

Within one or more of the sections, at least certain gas turbine engines define an annular opening. Certain of these annular openings may vary in size, such that a dedicated, specialized insertion tool must be utilized with each annular opening to extend around and through such annular opening.

The inventors of the present disclosure have come up with an insertion tool that may be inserted into an annular opening. The insertion tool that the inventors have come up with may benefit from the inclusion of relatively complex geometries and features. Accordingly, an insertion tool formed in a manner that meets these needs would be useful.

BRIEF DESCRIPTION

Aspects and advantages of the invention will be set forth in part in the following description, or may be obvious from the description, or may be learned through practice of the invention.

In one embodiment of the present disclosure, a tool for inserting into a cavity is provided. The tool includes a plurality of segments moveably coupled to one another, each segment moveable relative to an adjacent segment between a bent position and a coupled position, the plurality of segments including a first segment, the first segment including: a core formed of a first material; and a shell formed of a second material and comprising or defining a guide feature, a drive feature, a line guide, or a combination thereof; wherein the first material defines a greater stiffness than the second material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
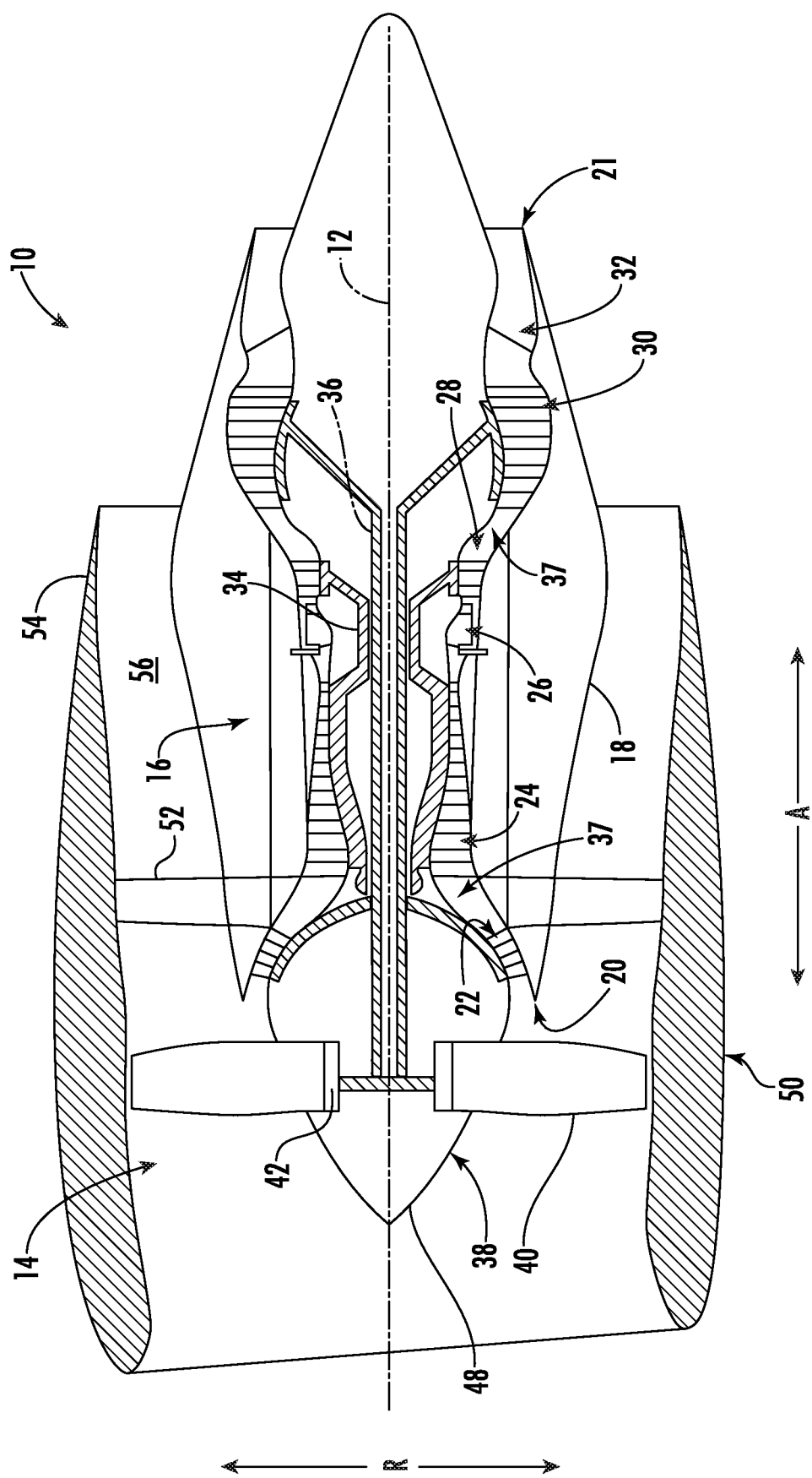
FIG. 1 is a schematic, cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions of a component or system. For example, with respect to a gas turbine engine, these terms refer to the normal operational attitude of the gas turbine engine or vehicle (e.g., with forward referring to a position closer to an engine inlet and aft referring to a position closer to an engine nozzle or exhaust). Similarly, with other components, these terms refer to a normal operational attitude of the component, such that forward refers to a position closer to a leading end and aft refers to a position closer to a trailing end.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. The turbofan engine 10 also defines a circumferential direction C (see FIG. 3) extending circumferentially about the axial direction A. In general, the turbofan 10 includes a fan section 14 and a turbomachine 16 disposed downstream from the fan section 14.

The exemplary turbomachine 16 depicted is generally enclosed within a substantially tubular outer casing 18 that defines an annular inlet 20 and an annular exhaust 21. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37 therethrough.

For the embodiment depicted, the fan section 14 includes a fixed pitch fan 38 having a plurality of fan blades 40. The fan blades 40 are each attached to a disk 42, with the fan blades 40 and disk 42 together rotatable about the longitudinal axis 12 by the LP shaft 36. For the embodiment depicted, the turbofan engine 10 is a direct drive turbofan engine, such that the LP shaft 36 drives the fan 38 of the fan section 14 directly, without use of a reduction gearbox. However, in other exemplary embodiments of the present disclosure, the fan 38 may instead be a variable pitch fan, and the turbofan engine 10 may include a reduction gearbox, in which case the LP shaft 36 may drive the fan 38 of the fan section 14 across the gearbox.

Referring still to the exemplary embodiment of FIG. 1, the disk 42 is covered by rotatable front hub 48 aerodynamically contoured to promote an airflow through the plurality of fan blades 40. Additionally, the exemplary turbofan engine 10 includes an annular nacelle assembly 50 that circumferentially surrounds the fan 38 and/or at least a portion of the turbomachine 16. For the embodiment depicted, the nacelle assembly 50 is supported relative to the turbomachine 16 by a plurality of circumferentially-spaced outlet guide vanes 52. Moreover, a downstream section 54 of the nacelle assembly 50 extends over an outer portion of the casing 18 so as to define a bypass airflow passage 56 therebetween. The ratio between a first portion of air through the bypass airflow passage 56 and a second portion of air through the inlet 20 of the turbomachine 16, and through the core air flowpath 37, is commonly known as a bypass ratio.

It will be appreciated that although not depicted in FIG. 1, the turbofan engine 10 may further define a plurality of openings allowing for inspection of various components within the turbomachine 16. For example, the turbofan engine 10 may define a plurality of borescope openings at various axial positions within the compressor section, combustion section 26, and turbine section. Additionally, as will be discussed below, the turbofan engine 10 may include one or more igniter ports within, e.g., the combustion section 26 of the turbomachine 16, that may allow for inspection of the combustion section 26.

It should further be appreciated that the exemplary turbofan engine 10 depicted in FIG. 1 is by way of example only, and that in other exemplary embodiments, the turbofan engine 10 may have any other suitable configuration, including, for example, any other suitable number of shafts or spools, turbines, compressors, etc. Additionally, or alternatively, in other exemplary embodiments, any other suitable turbine engine may be provided. For example, in other exemplary embodiments, the turbine engine may not be a turbofan engine, and instead may be configured as a turboshaft engine, a turboprop engine, turbojet engine, etc.

Figure 2:
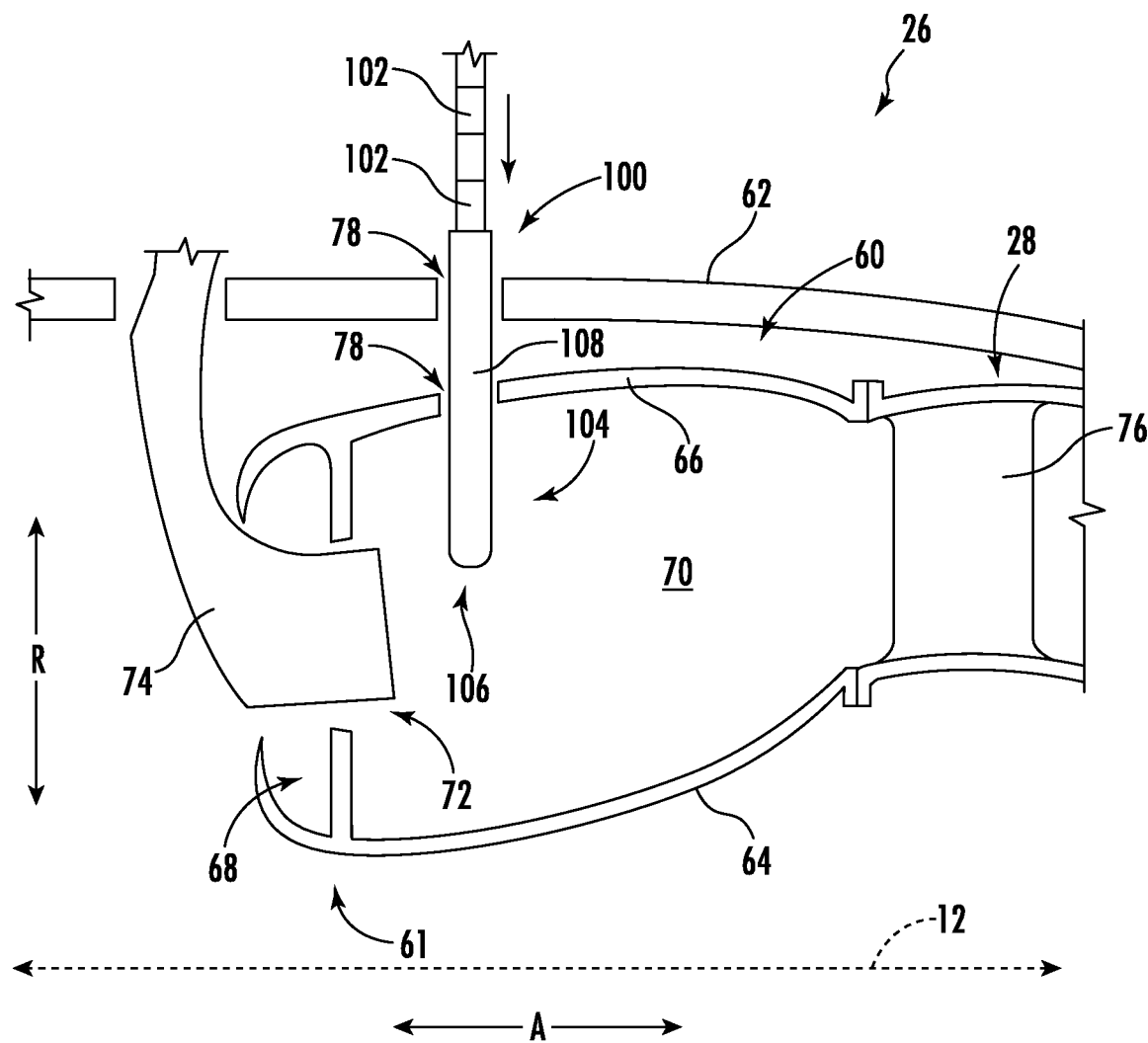
FIG. 2 is a close-up, cross-sectional view of a combustion section of the exemplary gas turbine engine of FIG. 1 including an insertion tool in accordance with an exemplary embodiment of the present disclosure, along an axial direction and a radial direction.

Referring now to FIG. 2, a close-up, schematic view of the combustion section 26 of the turbomachine 16 of the exemplary gas turbine engine 10 of FIG. 1 is provided along with a tool 100 for insertion into an annular section of the engine 10. It will be appreciated that although the tool 100 is depicted in FIG. 2, and described below, as being inserted into a combustion section 26, in other exemplary embodiments, the tool 100 may additionally, or alternatively, be inserted into other areas of the turbofan engine 10 having an annular shape or other shape. For example, the tool 100 may be inserted into annular sections of the compressor section or the turbine section, or alternatively still, other engines or systems altogether. Additionally or alternatively, still, the tool 100 may be inserted into a non-annular section.

As is depicted, the combustion section 26 generally includes a combustor 60 positioned within a combustor casing 62. Additionally, the combustor 60 includes an inner liner 64, an outer liner 66, and a dome 68 together defining at least in part a combustion chamber 70. It will be appreciated that the dome 68, for the embodiment depicted, is an annular dome and the combustor 60 is configured as an annular combustor. In such a manner, the combustion chamber 70 generally defines an annular shape. At a forward end 61, the combustor 60 defines, or rather, the dome 68 defines, a nozzle opening 72, and the combustion section 26 further includes a fuel-air mixer 74, or nozzle, positioned within the nozzle opening 72. The fuel-air mixer 74 is configured to provide a mixture of fuel and compressed air to the combustion chamber 70 during operation of the turbofan engine 10 to generate combustion gases. The combustion gases flow from the combustion chamber 70 to the HP turbine 28, and more specifically, through a plurality of inlet guide vanes 76 of the HP turbine 28.

Notably, although a single nozzle opening 72 and fuel-air mixer 74 is depicted in FIG. 2, the combustor 60 may further include a plurality of circumferentially spaced nozzle openings 72 and a respective plurality of fuel-air mixers 74 positioned within the nozzle openings 72.

In order to initiate a combustion of the fuel and compressed air provided to the combustion chamber 70 by the fuel-air mixer 74, the combustion section 26 typically includes one or more igniters (not installed or depicted) extending through respective igniter openings 78 defined in the combustor casing 62 and the outer liner 66 of the combustor 60. However, when the turbofan engine 10 is not operating, the igniter(s) may be removed and the igniter opening(s) 78 may be utilized for inspecting, e.g., the combustion chamber 70, inlet guide vanes 76 of the HP turbine 28, and/or other components.

More specifically, for the embodiment of FIG. 2, the tool 100 capable of insertion into an annular section of an engine is depicted extending through the pair of igniter openings 78 defined in the combustor casing 62 and the outer liner 66 of the combustor 60.

Figure 3:
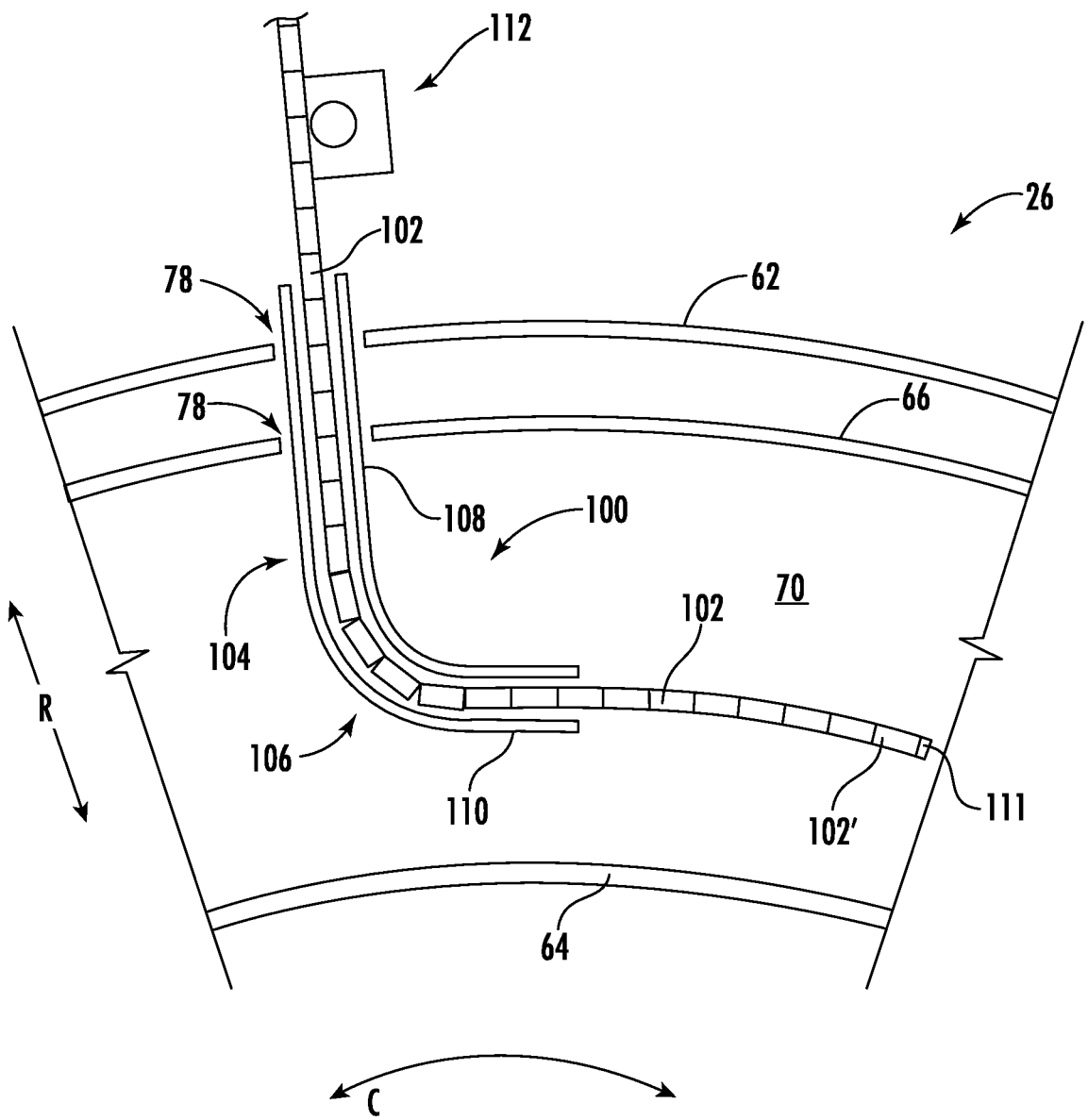
FIG. 3 is another close-up, cross-sectional view of the combustion section of the exemplary gas turbine engine of FIG. 1 including the exemplary insertion tool, along the radial direction and a circumferential direction.

Referring now also to FIG. 3, providing a partial, axial cross-sectional view of the combustion section 26 of FIG. 2, it will be appreciated that the tool 100 generally includes a plurality of segments 102 and an insertion tube 104, with the plurality of segments 102 movable through the insertion tube 104 into the combustion chamber 70.

Additionally, for the exemplary embodiment depicted, the insertion tube 104 includes a bend 106. For the embodiment shown, the bend 106 is a substantially 90 degree bend. For example, the insertion tube 104 includes a radial portion 108 extending substantially along the radial direction R and a circumferential portion 110 extending substantially along the circumferential direction C. The radial portion 108 and circumferential portion 110 are joined at the bend 106. The plurality of segments 102 are fed through the radial portion 108, pivot in a first angular direction relative to one another to go through the bend 106, and then pivot in a second, opposite angular direction relative to one another and couple to one another such that they are in a fixed position relative to one another as they move through to the circumferential portion 110. From the circumferential portion 110, the segments 102 extend through the annular combustion chamber 70.

Further, a forward-most segment 102' includes an implement, which for the embodiment depicted is a camera 111, to allow the user to inspect various components of the combustor 60 and/or high pressure turbine 28. It will be appreciated, however, that the insertion tool 100 may include any other suitable implement, such that the insertion tool 100 may be utilized for any suitable purpose. For example, the insertion tool 100 may be utilized to inspect the interior of the engine using, e.g., the camera 111. Additionally, or alternatively, the insertion tool 100 may include various other tool implements to perform one or more maintenance operations within the interior of the engine (e.g., drilling, welding, heating, cooling, cleaning, spraying, etc.).

Figure 4:
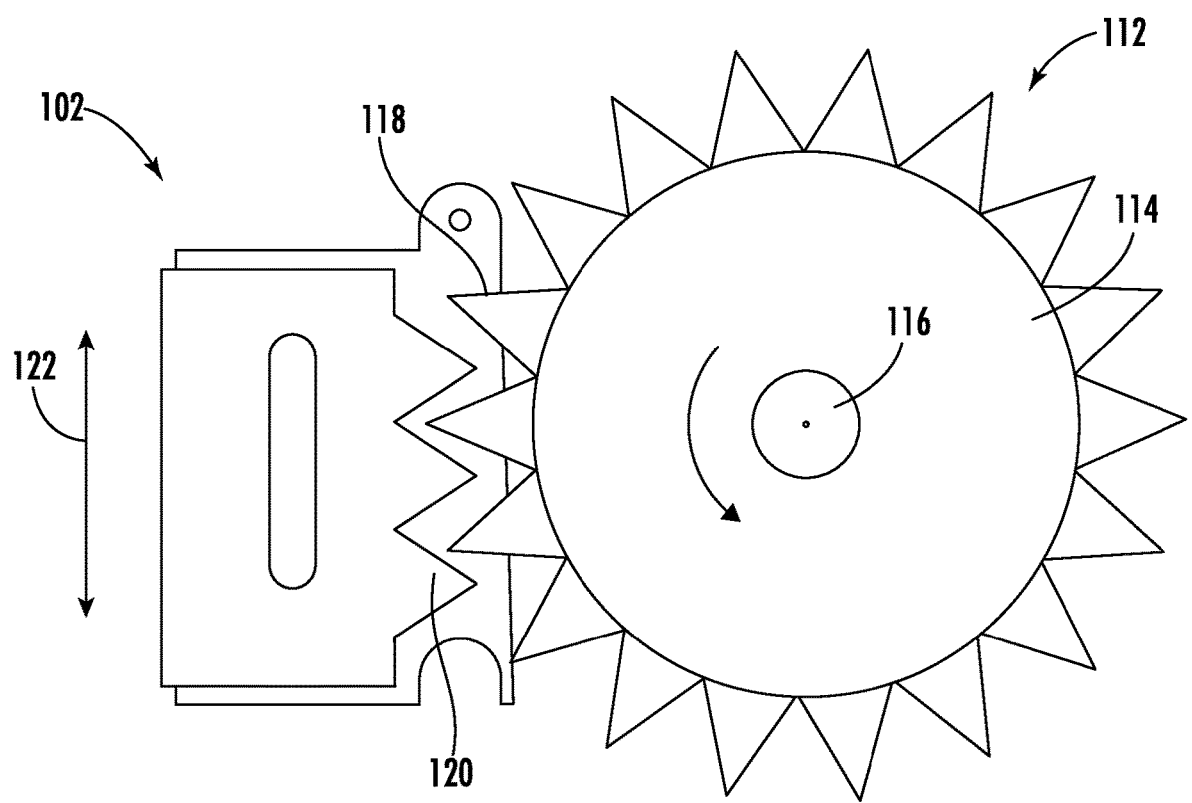
FIG. 4 is a close-up view of a drive portion of the exemplary insertion tool of FIG. 3.

Further, the exemplary insertion tool 100 includes a drive assembly 112 for driving the plurality of segments 102 of the insertion tool 100 into, or out of, the interior of the engine, and more specifically for the embodiment shown, into or out of the combustion chamber 70, through the insertion tube 104. Referring now briefly to FIG. 4, providing a close-up, schematic view of the drive assembly 112 and a single segment 102 of the plurality of segments 102, it will be appreciated that the exemplary drive assembly 112 generally includes a drive wheel 114 and a drive motor 116. The drive wheel 114 includes a plurality of drive gear teeth 118 spaced along a circumference thereof, and the drive motor 116 is configured to rotate the drive wheel 114. For the embodiment shown, and as will be described in more detail below, each segment 102 of the plurality of segments 102 includes a drive feature, which for the embodiment shown, is a plurality of segment gear teeth 120. The plurality of segment gear teeth 120 of the segment 102 are each configured to mesh with the plurality of drive gear teeth 118 of the drive wheel 114, such that rotation of the drive wheel 114 by the drive motor 116 moves the segment 102 along a longitudinal direction 122 of the segment 102.

Although not depicted, it will be appreciated that the drive motor 116 may be operably coupled to a controller or other control device, such that a length of the insertion tool 100 within the interior of the engine may be controlled with relative precision by the drive assembly 112.

Figure 5:
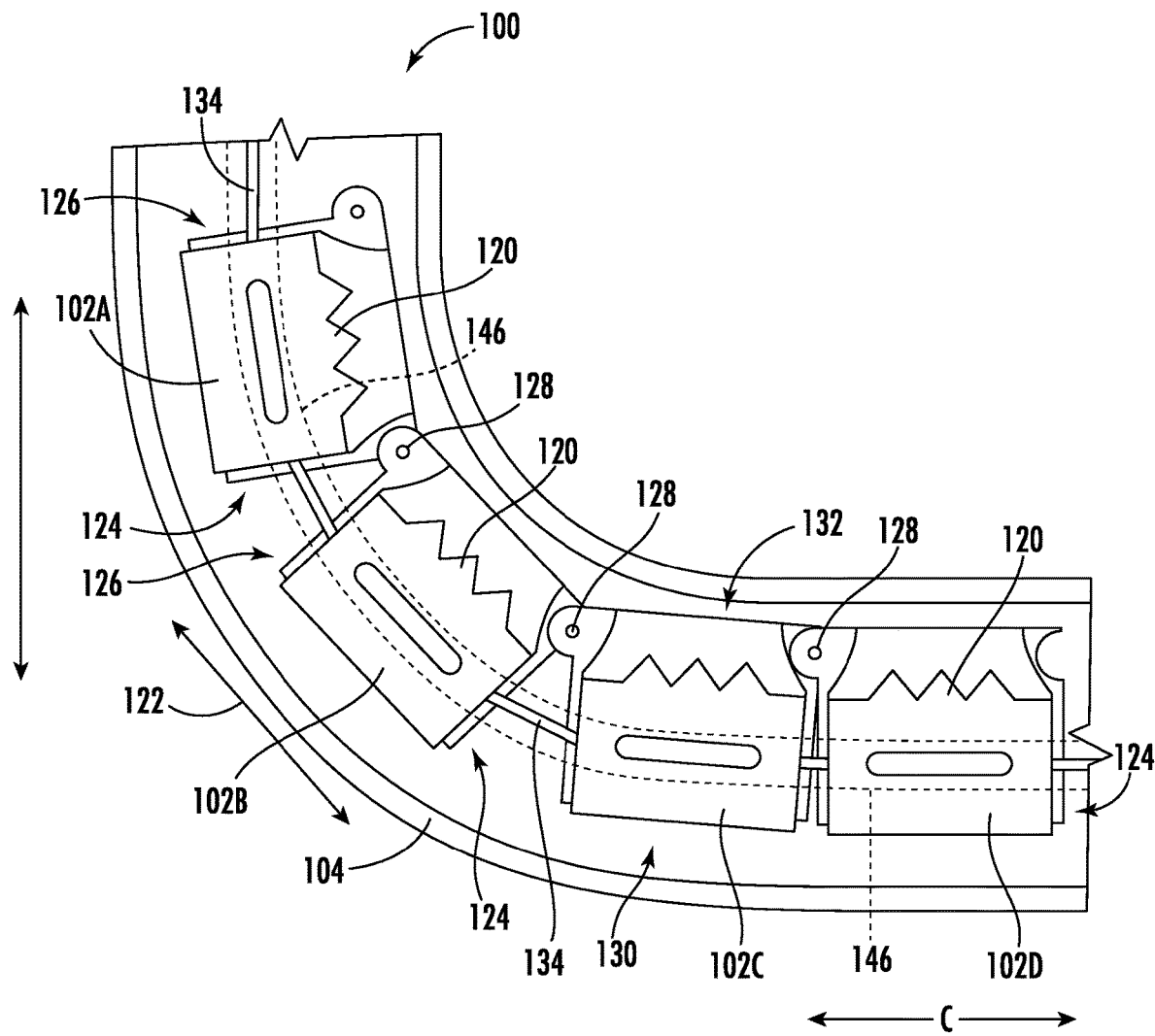
FIG. 5 is a close-up view of an insertion portion of the exemplary insertion tool of FIG. 4.

Referring now to FIG. 5, a close-up view of a portion of the tool 100 of FIGS. 2 and 3 is provided. Specifically, FIG. 5 provides a close-up view of four segments 102 of the plurality of segments 102 of the tool 100 extending through the bend 106 of the insertion tube 104. The segments 102 generally include a first segment 102A, a second segment 102B, a third segment 102C, and a fourth segment 102D.

Each of the segments 102 extend generally along a respective longitudinal direction 122 between a forward end 124 and an aft end 126, with the aft end 126 of one segment 102 being pivotably coupled to the forward end 124 of an aft-adjacent segment 102, and the forward end 124 of the segment 102 being pivotably coupled to the aft end 126 of a forward-adjacent segment 102. It will be appreciated, that as used herein, the term "longitudinal direction" with respect to a particular segment 102 refers to a direction extending between pivot axes 128 at the forward end 124 and aft end 126 of the segment 102 where the segment 102 is coupled to the adjacent segments 102, in a plane perpendicular to these pivot axes 128.

For example, the forward end 124 of the first segment 102A is pivotably coupled to the aft end 126 of the second segment 102B, the forward end 124 of the second segment 102B is pivotably coupled to the aft end 126 of the third segment 102C, and the forward end 124 of the third segment 102C is pivotably coupled to the aft end 126 of the fourth segment 102D.

Notably, each of the first segment 102A, second segment 102B, third segment 102C, and fourth segment 102D defines a respective outer side 132 and a respective inner side 130. The forward end 124 of the first segment 102A and the aft end 126 of the second segment 102B are pivotably coupled at their respective outer sides 132. Similarly, the forward end 124 of the second segment 102B and the aft end 126 of the third segment 102C are pivotably coupled at their respective outer sides 132, and the forward end 124 of the third segment 102C and the aft end 126 of the fourth segment 102D are pivotably coupled at their respective outer sides 132. It will be appreciated, however, that in other exemplary embodiments, the segments 102 may instead be pivotably coupled to one another at their respective inner sides 130, or a location between their respective outer and inner sides 132, 130.

Figure 6:
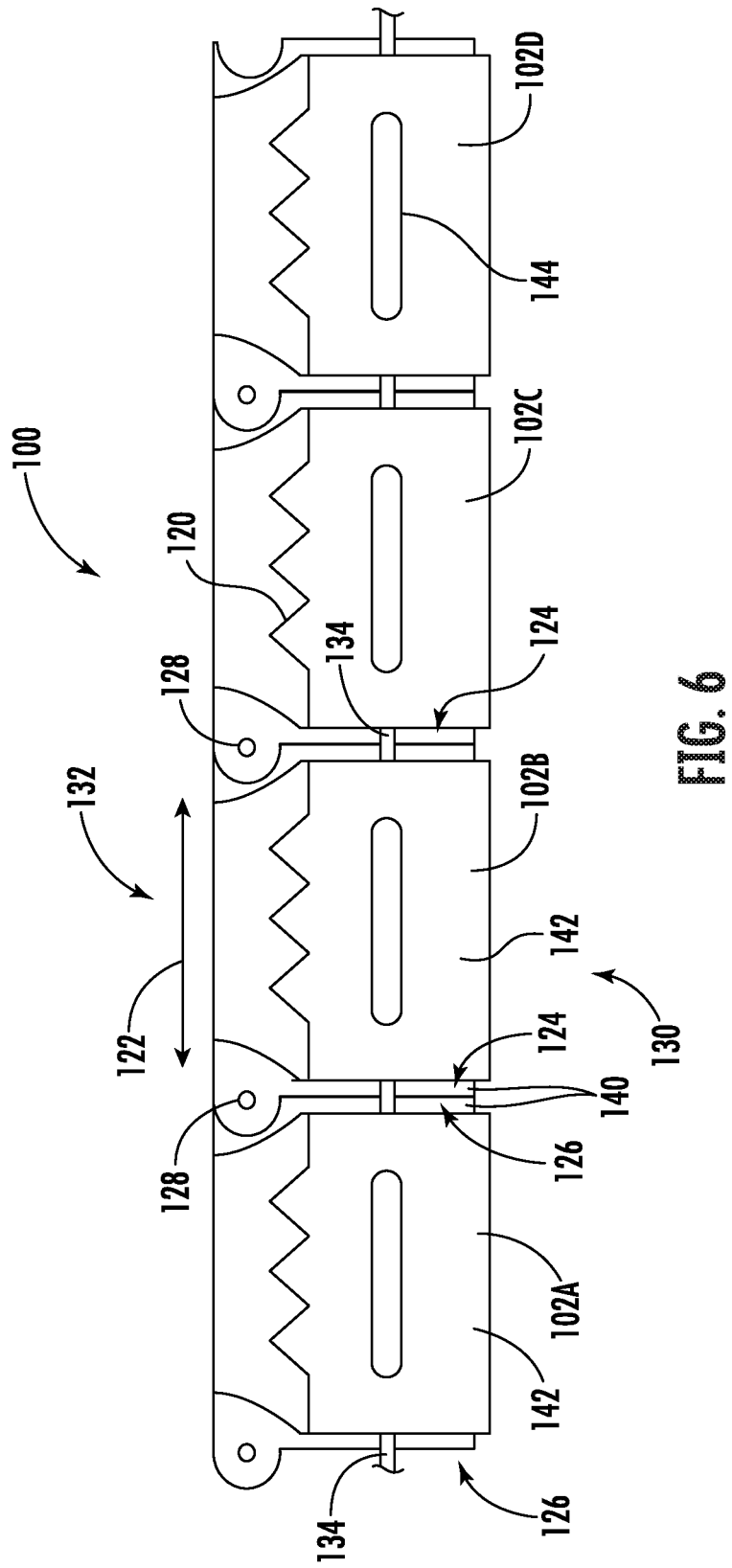
FIG. 6 is a close-up view of a portion of the exemplary insertion tool of FIG. 4 in a coupled position.

Referring now also to FIG. 6, a close-up view of the plurality of segments 102 of FIG. 5 are depicted extending through the combustion chamber 70 (not labeled; see FIGS. 2 and 3). As is depicted in FIGS. 5 and 6, the tool 100 additionally includes a biasing member, and more specifically a line assembly having one or more lines 134 configured to bias the segments 102 towards their respective coupled positions (discussed below).

For the embodiment shown, and as will be explained in more detail below, the line 134 extends through the plurality of segments 102, and specifically, for the embodiment shown, through at least the first segment 102A, the second segment 102B, the third segment 102C, and the fourth segment 102D. As stated, the line 134 is configured to bias the segments 102 towards their respective coupled positions (discussed below), for example, to bias the first segment 102A towards the coupled position relative to the second segment 102B. For the embodiment shown, the line 134 is configured to extend through line guides 136 (see FIG. 7, discussed below) within each of the segments 102 for providing a biasing force to press the segments 102 together.

In certain exemplary embodiments, the line 134 may be configured as a metal line, or any other suitable material or line. However, in still other embodiments, any other suitable biasing member may be provided. For example, in other embodiments, the line 134 may be a plurality of lines, with each line 134 extending between a pair of adjacent segments 102 of the tool 100, or alternatively, with each line 134 extending from a base of the tool 100 to an individual segment 102 to provide the biasing of the individual segment 102 towards a coupled position relative to an aft-adjacent segment 102. Additionally, or alternatively, the biasing member may be a plurality of springs extending between adjacent segments 102, with each spring oriented axially to pull the segments 102 together, or torsionally to bendably bias the segments 102 towards each other by rotation about their respective axis 128. Further, in still other exemplary embodiments, the biasing member may not be a tension member, and instead may be any other suitable biasing member, such as one or more magnets and/or ferromagnetic materials.

Figure 7:
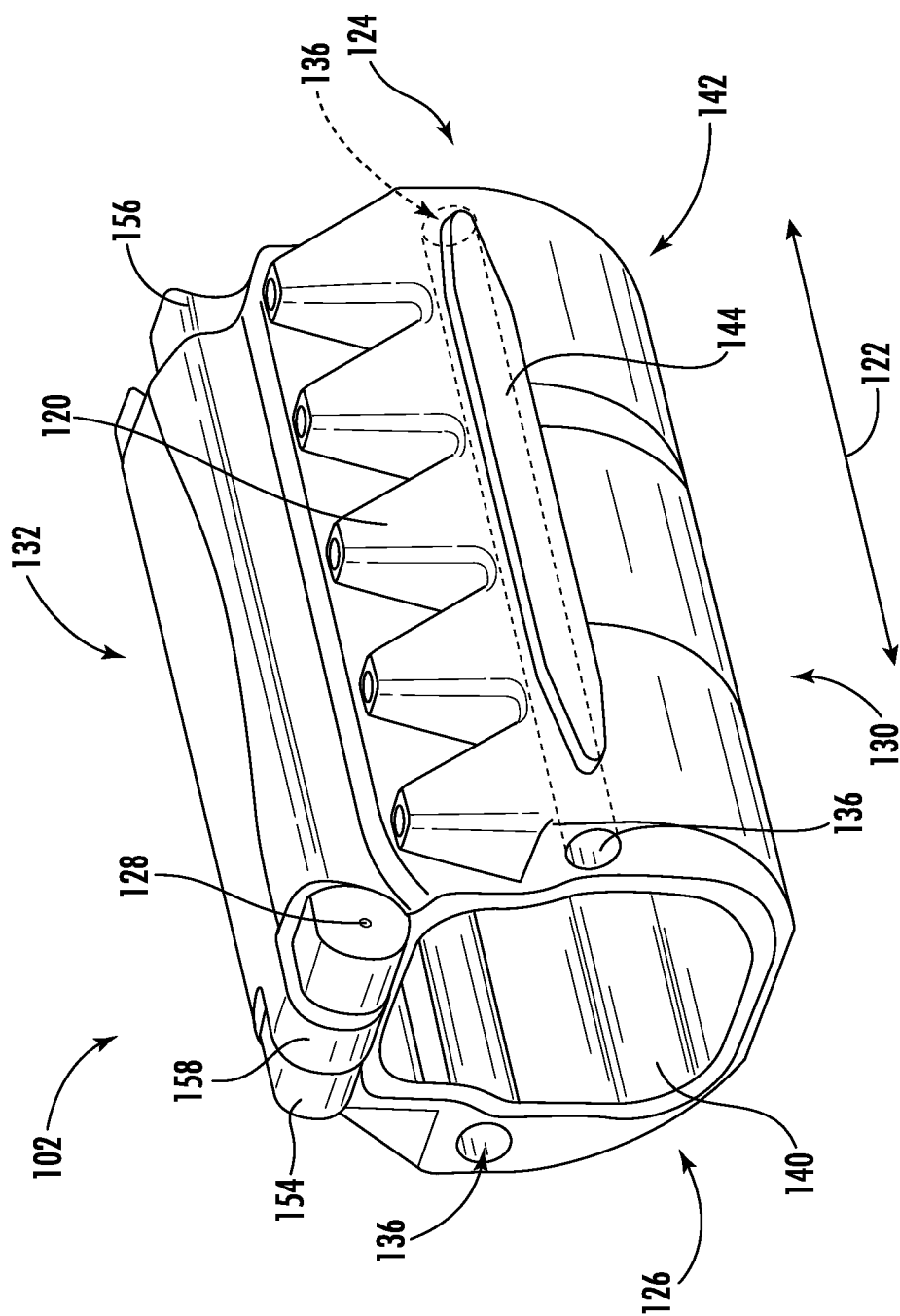
FIG. 7 is a perspective view of a segment of an insertion tool in accordance with an exemplary embodiment of the present disclosure.
Figure 8:
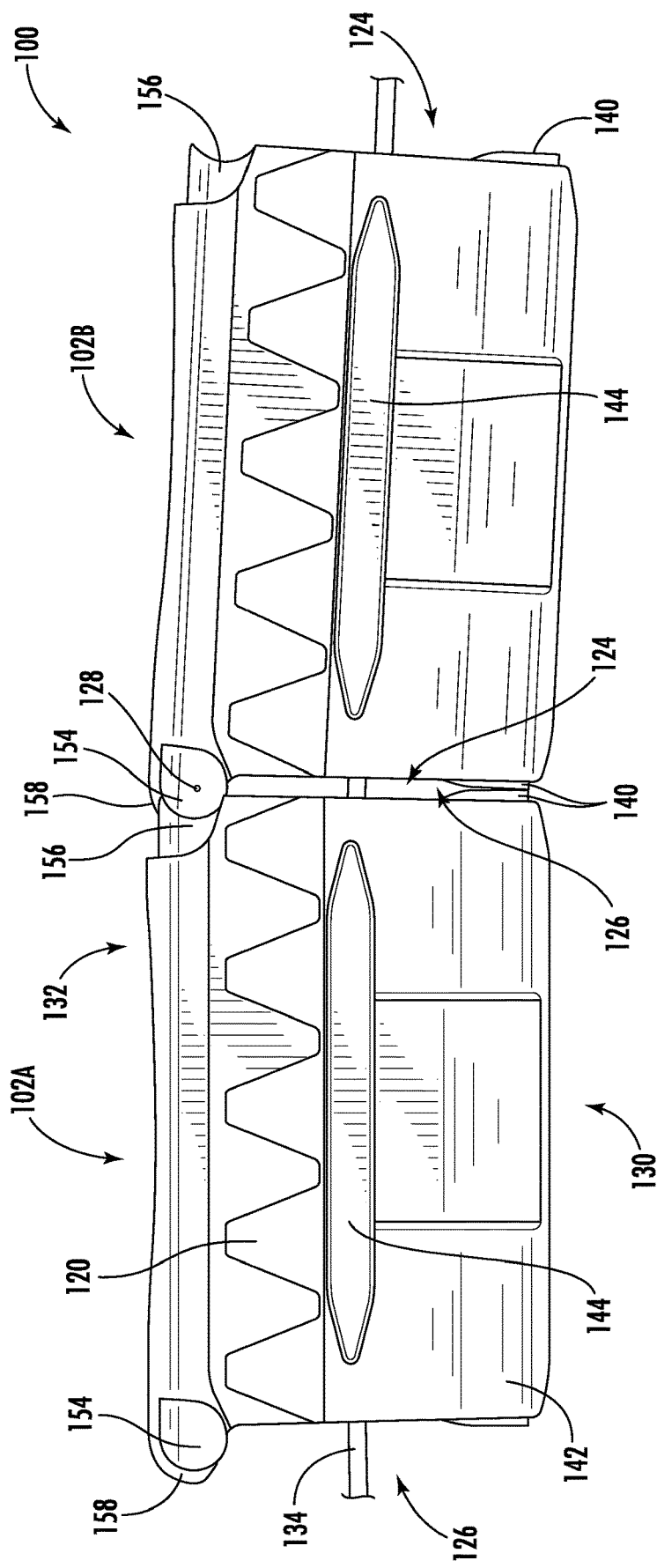
FIG. 8 is close-up view of a portion of the exemplary insertion tool of FIG. 7 in a coupled position.

Referring now to FIGS. 7 and 8, views of a tool 100 in accordance with an embodiment of the present disclosure are provided. In particular, FIG. 7 provides a perspective view of an individual segment 102 of a plurality of segments 102 of the exemplary tool 100, and FIG. 8 provides a side view of two segments 102 of the plurality of segments 102 of the exemplary tool. The exemplary tool 100 of FIGS. 7 and 8 may be configured in a similar manner to the tool 100 described above with respect to FIGS. 5 and 6. As will be appreciated from the views of the segments 102 depicted in FIGS. 7 and 8, each segment 102 of the plurality of segments 102 is formed of at least two different materials specifically designed to impart particular mechanical properties to each segment 102 of the plurality of segments 102.

Specifically, for the embodiment affected, the segment 102 includes a core 140 formed of a first material and a shell 142 formed of a second material. The first material defines a first material stiffness, and the second material defines a second material stiffness. The stiffness of the first material is greater than the stiffness of the second material. Specifically, in at least certain exemplary embodiments, the first material stiffness is at least about five (5) times greater than the second material stiffness as measured in a suitable engineering unit for stiffness, such as gigapascals (GPa). For example, in at least certain exemplary embodiments, the first material stiffness may be at least about 20 times greater than the second material stiffness, such as at least about 50 times greater than the second material stiffness (see also discussion below).

Referring particularly to FIG. 8, it will be appreciated that the core 140 of the segment 102 depicted in FIG. 7 is configured to abut a core 140 of a forward-adjacent segment 102, as well as a core 140 of an aft-adjacent segment 102 (see also, e.g., FIG. 6). For example, in the embodiment of FIG. 8, it will be appreciated that the core 140 of the second segment 102B is configured to abut core 140 of the first segment 102A, and is further configured to abut the core 140 of a third segment (not shown, see segment 102C of FIG. 6).

In such a manner, it will be appreciated that the plurality of segments 102, when in the coupled position, may define a desired overall stiffness for the tool 100. More specifically, by having the core 140 of each segment 102 abut the cores 140 of the adjacent segments 102, the plurality of segments 102 when in the coupled position may together define the desired overall stiffness for the tool 100, allowing the tool 100 to extend a desired length within the environment, while still being capable of moving with a desired precision and/or carry a desired load.

For example, in certain exemplary embodiments, the first material, forming the core 140 of the segment 102, may be a relatively stiff material defining a stiffness greater than about 100 GPa, such as greater than about 125 GPa, such as greater than about 175 GPa, such as up to about 12,000 GPa. By contrast, the second material, forming the shell 142 of the segment 102, maybe a relatively low stiffness material defining a stiffness less than about 100 GPa, such as less than about 75 GPa, such as less than about 50 GPa, such as less than about 25 GPa, such as at least about 0.01 GPa. By way of example, the first material may be one or more of a metal material (such as a titanium or titanium alloy, copper, steel, or stainless steel), may be a ceramic material (such as a reinforced ceramic, such as a whisker reinforced ceramic or other fiber reinforced ceramic), may be a carbon fiber reinforced plastic, etc. Also by way of example, the second material may be one or more of a polymer, a plastic polymer (such as an acetal polymer, acrylonitrile butadiene styrene (ABS), polycarbonate (PC), polycarbonate (PC), polystyrene, or polyvinyl chloride (PVC)), may be a rubber material, etc.

In such a manner, it will be appreciated that the core 140 may be formed through one or more traditional manufacturing methods, such as by casting, extruding, 3D printing/additive manufacturing, etc. Given the relative simplicity of the geometry of the core 140, it may be relatively easy to form the core 140 with a relatively hard and stiff material through a variety of manufacturing methods.

By contrast, the shell 142 of the segment 102 may be overmolded onto the core 140 subsequent to the formation of the core 140. For the embodiment shown, the shell 142 substantially completely covers an entirety of an exterior of the core 140. For example, in only certain exemplary embodiments, the shell 142 may cover at least about 75% of the exterior of the core 140, such as at least about 90% of the exterior of the core 140 (with the "exterior" of the core 140 being the portion of the core 140 that would otherwise be viewable when the plurality of segments 102 are in the coupled position). In such a manner, it will be appreciated that the shell 142 of the segment 102 may be formed through a thermal melt-based molding process. However, in other embodiments, the shell 142 of the segment 102 may be formed through any other suitable process, such as through a reaction injection molding process, which may more easily allow for molding of materials which are not plastics.

As will be explained in more detail below, the shell 142 may include more complex geometries than the core 140, such that it may be relatively easy to form the shell 142 with a more moldable material, such as one or more of the materials listed above as exemplary second materials. Further, forming the segment 102 in such a manner may allow for features included with or defined by the shell 142 of the segment 102 to have different mechanical properties than the core 140.

As noted above, the shell 142 of the core 140 may include or define more complex geometries than the core 140. Specifically, in the embodiment shown, the shell 142 includes or defines a guide feature, a drive feature, a line guide 136, or a combination thereof. More specifically, for the embodiment shown, the shell 142 includes or defines each of the guide feature, the drive feature, and the line guide 136.

For example, the drive feature of the shell 142 includes the plurality of segment gear teeth 120, which are configured to mesh with the plurality of drive gear teeth 118 of the drive assembly 112 described above with reference to FIG. 4. In such a manner, the plurality of segment gear teeth 120 to be configured to move the segment 102 forward or back during operation. It will be appreciated, however, that in other embodiments, the drive feature of the shell 142 may be configured in any other suitable manner. For example, in other embodiments, the drive feature may be one or more differently configured drive gear teeth 118, or alternatively may be any other suitable geometry for providing friction for a drive assembly 112, such as the exemplary drive wheel 114, to grip the segment 102 and move segment 102 forward or back. For example, the drive feature may be a plurality of ridges, or other structure.

Also as noted above, utilizing a different second material for the shell 142 and the first material for the core 140 may allow for the shell 142 to have different mechanical properties than the core 140. For example, as discussed above, it may be important for the core 140 to have a relatively high stiffness, such that the tool 100 defines a relatively high overall stiffness during operation. However, such may not necessary be a mechanical property that is important or desirable for shell 142. In particular, for the embodiment discussed herein with respect to FIGS. 7 and 8, it may be desirable for the drive feature of the shell 142 to be configured to wear more quickly than, e.g., the drive gear teeth 118 of the drive wheel 114. For example, it will be appreciated that the second material defines a second material hardness and the drive gear teeth 118 of the drive wheel 114 may be formed of a material defining a material hardness greater than the second material hardness. In such manner, the drive feature of the shell 142 may be configured to wear down more quickly than the drive gear teeth 118 of the drive wheel 114, which may be desirable given that each drive gear tooth 118 is likely to engage with segment gear teeth 120 many more times than each segment gear tooth 120 is likely to engage with drive gear teeth 118.

Figure 9:
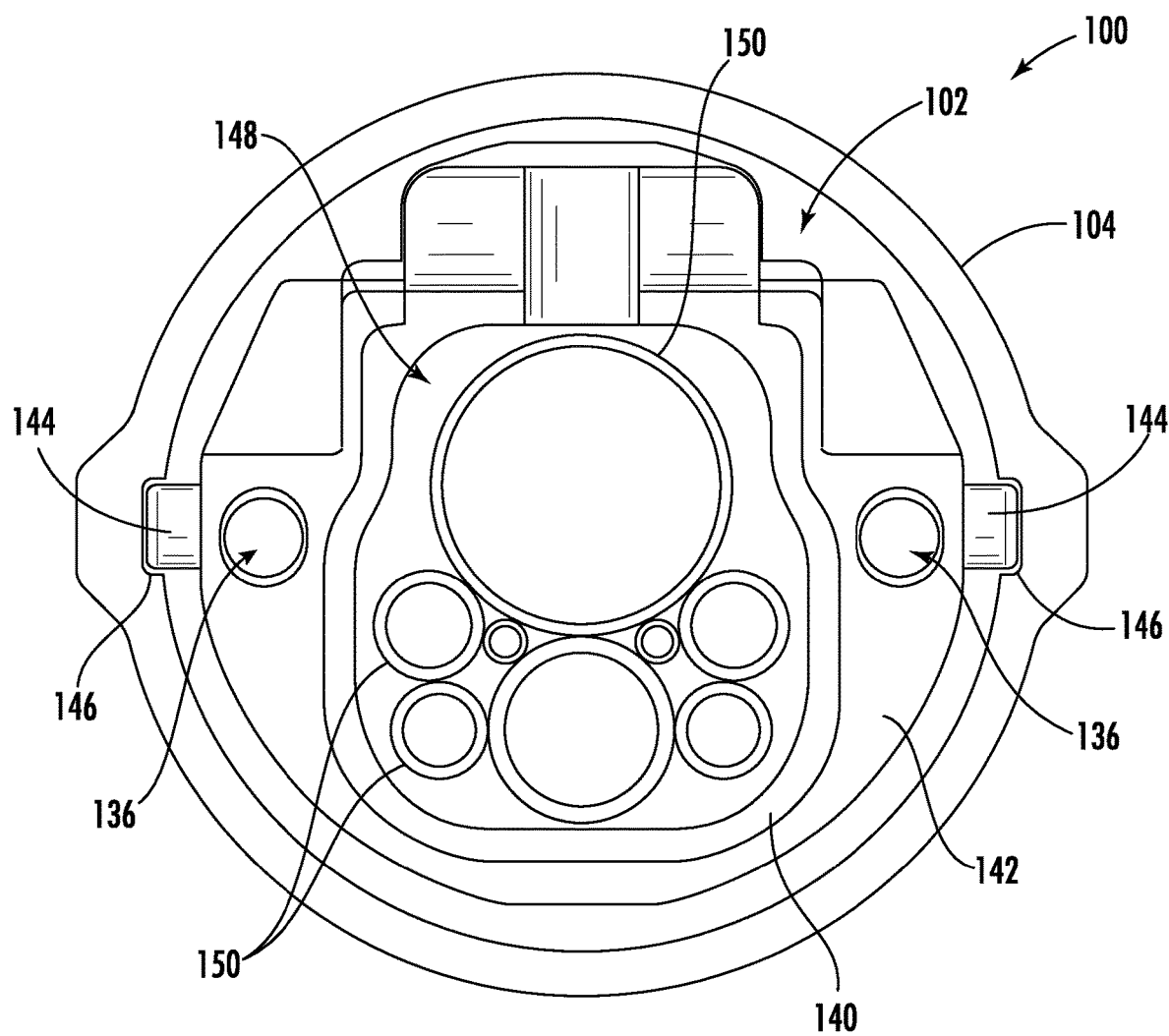
FIG. 9 is an end view of the exemplary segment of FIG. 7.

In addition, the shell 142, formed of the second material, includes the guide feature. For the embodiment shown, the guide feature is a segment sliding plain bearing feature 144. The segment sliding plain bearing feature 144 may be configured to guide the segment 102 through the insertion tube 104, while also ensuring the segment 102 maintains a desired orientation within the insertion tube 104. Specifically, referring now also to FIG. 9, providing an end view of one of the segments 102 in FIG. 8, positioned within an insertion tube 104, it will be appreciated that the insertion tube 104 similarly includes a tube sliding plain bearing feature 146. The tube sliding plain bearing feature 146 is configured to interact with the segment sliding plain bearing feature 144. In particular, it will be appreciated that for the embodiment shown, the tube sliding plain bearing feature 146 is configured as a channel or other indentation in a wall of the insertion tube 104, and the segment sliding plain bearing feature 144 is configured as a linear protrusion extending outward from the core 140 (and proud of the surrounding portions of the shell 142) and along the longitudinal direction 122 of the segment 102. In such a manner, the segment sliding plain bearing feature 144 may be positioned at least partially within the tube sliding plain bearing feature 146 to prevent the segment 102 from becoming misaligned or twisted out of orientation when being inserted through the insertion tube 104.

Notably, by forming the shell 142 of the second material, separate from the first material of the core 140, the shell 142 may be formed of material to facilitate the segment sliding plain bearing feature 144 operating as desired with, e.g., the tube sliding plain bearing feature 146. For example, it will be appreciated that in only certain exemplary embodiments, such as exemplary embodiment depicted, the first material may define a first coefficient of friction and the second material may define a second coefficient of friction. The first coefficient of friction is at least about fifteen percent greater than the second coefficient of friction (i.e., μ(first material) =μ(second material)×1.15). Specifically, in at least some embodiments, the first coefficient of friction may be at least about thirty percent greater than the second coefficient of friction, such as at least about fifty percent greater than the second session of friction, such as up to about 1,000% greater than the second coefficient of friction. Such a configuration may enable the segment 102 to relatively easily slide along within the insertion tube 104, without necessitating, e.g., lubricated bearings or other more complex mechanical structures, lubrications, etc.

Further, as with the drive feature, it may be beneficial for the segment sliding plain bearing feature 144 to wear more quickly than the tube sliding plain bearing feature 146 of the insertion tube 104. As such, it will be appreciated that in at least certain exemplary embodiments, a material hardness of the material forming or defining the tube sliding plain bearing feature 144 may be greater than the second material hardness of the second material forming the shell 142 and the segment sliding plain bearing feature 144.

It will be appreciated, however, that although the exemplary tool 100 depicted includes sliding plain bearing features 144, 146, in other exemplary embodiments, other guide features may be provided. For example, in other embodiments, the shell 142 of the segments 102 may incorporate a roller bearing design, or the tube sliding plain bearing feature 146 may additionally or alternatively utilize a roller bearing design. Additionally, or alternatively, still, one or both of the sliding plain bearing features 144, 146 may be replaced with or supplemented with, e.g., air bearing features, lubrication bearing features, etc.

Moreover, as noted above, the shell 142 includes the line guide 136. For the embodiment shown, the line guide 136 extends substantially from the forward end 124 of the segment 102 to the aft end 126 of the segment 102 along the longitudinal direction 122 the segment 102. As discussed above, the second material may define a relatively low coefficient of friction. Such may assist with threading the line 134 through the line guides 136 of the various segments 102. As also discussed above, the second material may define a relatively low material hardness. In certain exemplary embodiments, the line 134 may be formed of a line material defining a line material hardness greater than the second material hardness. Such may ensure that operation of the tool 100 does not appreciably wear down the line 134, such wear potentially resulting in a failure of the tool 100 within an environment.

Referring to FIGS. 7 and 8, it will be appreciated that adjacent segments 102 are pivotably contacting one another at a joint 152, which for the embodiment shown is positioned generally at the outer side 132. The joint 152 is formed, for the embodiment shown, of a pair of rounded protrusions 154 on a first segment 102A and a corresponding pair of indention members 156 on a second segment 102B (see FIG. 8). The rounded protrusions 154 and indention members 156 have corresponding geometries, and each of the pair of rounded protrusions 154 and indention members 156 are spaced from one another in a cross-wise direction along the pivot axis 128. The rounded protrusions 154 and indention members 156 are, for the embodiment shown, formed as part of the core 140. However, the segments 102 shown further include an alignment feature 158 positioned between one of the pair of rounded protrusions 154 or pair of indention members 156 for extending into an opening between the other of the pair of rounded protrusions 154 or indention members 156. Particularly for the embodiment shown the alignment feature 158 is positioned between the pair of rounded protrusions 154 and extends between the pair of indention members 156 to assist with aligning the adjacent segments 102. For the embodiment shown, the alignment feature 158 is formed as part of the shell 142.

Briefly, referring still to FIG. 8, it will be appreciated that the segments 102 may define an interior opening 148 allowing for supporting structure for the various tool implements described above. In particular, for the embodiment shown, the tool 100 includes a variety of structures 150 extending along a length of the plurality of structures encasing, e.g., fluid flow paths, electrical lines, etc. In such a manner, the opening through the plurality of segments 102 may enable operation of a wide variety of tool implements at, e.g., a distal end of the plurality of segments 102, such as at the forward-most segment 102'.

In view of the above description, it will be appreciated that forming the shell 142 of the second material may allow for a segment 102 that maintains a desired stiffness and strength, while also having a variety of relatively complex geometry features, with these relatively complex geometry features defining material properties having specific benefits that would otherwise be difficult to obtain. Moreover, forming the shell 142 of the second material may reduce the weight of the segment 102, and therefore, a weight of the tool 100.

Further aspects of the invention are provided by the subject matter of the following clauses:

A tool for inserting into a cavity, the tool comprising a plurality of segments moveably coupled to one another, each segment moveable relative to an adjacent segment between a bent position and a coupled position, the plurality of segments comprising a first segment, the first segment comprising: a core formed of a first material; and a shell formed of a second material and comprising or defining a guide feature, a drive feature, a line guide, or a combination thereof; wherein the first material defines a greater stiffness than the second material.

The tool of any of the preceding clauses, wherein the core of the first segment is configured to abut a core of a forward adjacent segment and a core of an aft-adjacent segment.

The tool of any of the preceding clauses, wherein the shell comprises the drive feature, wherein the drive feature is a plurality of gear teeth.

The tool of any of the preceding clauses, wherein the shell comprises the guide feature, and wherein the guide feature is a segment bearing feature.

The tool of any of the preceding clauses, wherein the first material defines a first coefficient of friction, wherein the second material defines a second coefficient of friction, and wherein the first coefficient of friction is at least about fifteen percent greater than the second coefficient of friction.

The tool of any of the preceding clauses, wherein the segment bearing feature is a segment sliding bearing feature, and wherein the tool further comprises: an insertion tube comprising a tube sliding plain bearing feature configured to interact with the segment sliding plain bearing feature, wherein the tube sliding plain bearing feature is formed of a third material defining a third material hardness greater than a second material hardness of the second material.

The tool of any of the preceding clauses, wherein the shell comprises the line guide.

The tool of any of the preceding clauses, wherein the first segment defines a local longitudinal direction, a first end, and a second end, and wherein the line guide extends substantially from the first end to the second end along the local longitudinal direction.

The tool of any of the preceding clauses, further comprising: a tension line configured to hold the segments in the coupled position, wherein the tension line is formed of a line material defining a line material hardness greater than a second material hardness of the second material.

The tool of any of the preceding clauses, wherein the first material is a metal material, a ceramic material, or a combination thereof, and wherein the second material is a polymer material.

The tool of any of the preceding clauses, wherein the first material defines a first material stiffness, wherein the second material defines a second material stiffness, and wherein the first material stiffness is at least five times greater than the second material stiffness.

The tool of any of the preceding clauses, wherein the tool is configured as an insertion tool, and wherein the cavity is an annular cavity of a gas turbine engine.

The tool of any of the preceding clauses, wherein the shell of the first segment is overmolded onto the core, and wherein the shell substantially covers an entirety of an exterior of the core.

A gas turbine engine assembly comprising: a component defining an opening to a cavity within the gas turbine engine; and an insertion tool extending through the opening defined by the component into the cavity, the insertion tool comprising a plurality of segments moveably coupled to one another, each segment moveable relative to an adjacent segment between a bent position and a coupled position, the plurality of segments comprising a first segment, the first segment comprising a core formed of a first material, and a shell formed of a second material and comprising or defining a guide feature, a drive feature, a line guide, or a combination thereof, wherein the first material defines a greater stiffness than the second material.

The gas turbine engine of any of the preceding clauses, wherein the cavity is an annular cavity of the gas turbine engine.

The gas turbine engine of any of the preceding clauses, wherein the core of the first segment is configured to abut a core of a forward adjacent segment and a core of an aft-adjacent segment.

The gas turbine engine of any of the preceding clauses, wherein the shell comprises the drive feature, wherein the drive feature is a plurality of gear teeth.

The gas turbine engine of any of the preceding clauses, wherein the shell comprises the guide feature, and wherein the guide feature is a segment sliding plain bearing feature.

The gas turbine engine of any of the preceding clauses, wherein the first material defines a first coefficient of friction, wherein the second material defines a second coefficient of friction, and wherein the first coefficient of friction is at least about fifteen percent greater than the second coefficient of friction.

The gas turbine engine of any of the preceding clauses, wherein the shell comprises the line guide.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tool for inserting into a cavity, the tool comprising: a plurality of segments moveably coupled to one another, each segment moveable relative to an adjacent segment between a bent position and a coupled position, the plurality of segments comprising a first segment, the first segment comprising:
a core formed of a first material;
a shell formed of a second material and comprising a guide feature, a drive feature, a line guide, or a combination thereof;
wherein the first material defines a greater stiffness than the second material;
wherein the guide feature includes a dedicated bearing surface on the shell;
wherein the drive feature includes a repeating surface profile on the shell; and
wherein a tension line extends through the line guide to continuously bias the first segment toward the coupled position with an adjacent segment of the plurality of segments.

2. The tool of claim 1, wherein the core of the first segment is configured to abut a core of a forward adjacent segment and a core of an aft-adjacent segment.

3. The tool of claim 1, wherein the repeating surface profile is a plurality of gear teeth.

4. The tool of claim 1, wherein the first segment defines a local longitudinal direction, a first end, and a second end, and wherein the line guide extends substantially from the first end to the second end along the local longitudinal direction.

5. The tool of claim 1, wherein the tension line is configured to hold the plurality of segments in the coupled position, and wherein the tension line is formed of a line material defining a line material hardness greater than a second material hardness of the second material.

6. The tool of claim 1, wherein the first material is a metal material, a ceramic material, or a combination thereof, and wherein the second material is a polymer material.

7. The tool of claim 1, wherein the first material defines a first material stiffness, wherein the second material defines a second material stiffness, and wherein the first material stiffness is at least five times greater than the second material stiffness.

8. The tool of claim 1, wherein the tool is configured as an insertion tool, and wherein the cavity is an annular cavity of a gas turbine engine.

9. The tool of claim 1, wherein the shell of the first segment is overmolded onto the core, and wherein the shell of the first segment substantially covers an entirety of an exterior of the core.

10. A tool for inserting into a cavity, the tool comprising: a plurality of segments moveably coupled to one another, each segment moveable relative to an adjacent segment between a bent position and a coupled position, the plurality of segments comprising a first segment, the first segment comprising:
a core formed of a first material;
a shell formed of a second material and comprising or defining a guide feature, a drive feature, a line guide, or a combination thereof;
wherein the first material defines a greater stiffness than the second material; and
wherein the shell comprises the guide feature, and wherein the guide feature is a segment bearing feature.

11. The tool of claim 10, wherein the first material defines a first coefficient of friction, wherein the second material defines a second coefficient of friction, and wherein the first coefficient of friction is at least about fifteen percent greater than the second coefficient of friction.

12. The tool of claim 10, wherein the segment bearing feature is a segment sliding bearing feature, and wherein the tool further comprises:
an insertion tube comprising a tube sliding plain bearing feature configured to interact with the segment sliding bearing feature, wherein the tube sliding plain bearing feature is formed of a third material defining a third material hardness greater than a second material hardness of the second material.

13. A gas turbine engine comprising:
a component defining an opening to a cavity within the gas turbine engine; and
an insertion tool extending through the opening defined by the component into the cavity, the insertion tool comprising:
a plurality of segments moveably coupled to one another, each segment moveable relative to an adjacent segment between a bent position and a coupled position, the plurality of segments comprising a first segment, the first segment comprising a core formed of a first material, and a shell formed of a second material and comprising or defining a guide feature, a drive feature, a line guide, or a combination thereof, wherein the first material defines a greater stiffness than the second material, wherein the core of the first segment is configured to abut a core of a forward adjacent segment and a core of an aft-adjacent segment.

14. The gas turbine engine of claim 13, wherein the cavity is an annular cavity of the gas turbine engine.

15. The gas turbine engine of claim 13, wherein the shell comprises the drive feature, wherein the drive feature is a plurality of gear teeth.

16. The gas turbine engine of claim 13, wherein the shell comprises the guide feature, and wherein the guide feature is a segment sliding plain bearing feature.

17. The gas turbine engine of claim 16, wherein the first material defines a first coefficient of friction, wherein the second material defines a second coefficient of friction, and wherein the first coefficient of friction is at least about fifteen percent greater than the second coefficient of friction.

18. The gas turbine engine of claim 13, wherein the shell comprises the line guide.

19. The gas turbine engine of claim 13, wherein the drive feature includes a repeating surface profile on the shell.

20. The gas turbine engine of claim 13 wherein a tension line extends through the line guide to hold the first segment in the coupled position with an adjacent segment of the plurality of segments.

* * * * *